(12) United States Patent
Hwang (10) Patent No.: US 10,778,924 B2
(45) Date of Patent: Sep. 15, 2020

(54) IMAGE SENSING DEVICE (71) Applicant: SK hynix Inc., Icheon-si (KR)

(72) Inventor: Won-Seok Hwang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/148,831

(22) Filed: Oct. 1, 2018

(65) Prior Publication Data

US 2019/0141269 A1 May 9, 2019

(30) Foreign Application Priority Data

Nov. 8, 2017 (KR) .......................... 10-2017-0148123

(51) Int. Cl.
H04N 5/378 (2011.01)
H04N 5/374 (2011.01)

(52) U.S. Cl.
CPC ........... *H04N 5/378* (2013.01); *H04N 5/3741* (2013.01); *H04N 5/3742* (2013.01)

(58) Field of Classification Search
CPC .... H04N 5/378; H04N 5/3742; H04N 5/3741; H04N 3/1575; H04N 5/37213
See application file for complete search history.

(56) References Cited

U.S. PATENT DOCUMENTS

| | | | | |
|---|---|---|---|---|
| 2009/0303364 A1* | 12/2009 | Shibata | .............. | H04N 5/37455 348/302 |
| 2010/0289931 A1* | 11/2010 | Shibata | .................. | H04N 5/374 348/294 |
| 2013/0088628 A1* | 4/2013 | Itano | ..................... | H04N 5/3658 348/308 |
| 2015/0124926 A1* | 5/2015 | Choi | ....................... | H03K 21/10 377/53 |
| 2015/0138408 A1* | 5/2015 | Lee | ......................... | H04N 5/378 348/294 |
| 2015/0181145 A1* | 6/2015 | Lee | ......................... | H04N 5/378 250/208.1 |
| 2015/0201144 A1* | 7/2015 | Kobayashi | ............. | H04N 5/378 348/308 |
| 2018/0324416 A1* | 11/2018 | Kim | ....................... | H04N 17/002 |
| 2019/0098234 A1* | 3/2019 | Lee | ....................... | H04N 5/3575 |

FOREIGN PATENT DOCUMENTS

KR 10-1999-0085269 12/1999
KR 10-2015-0020432 2/2015

* cited by examiner

*Primary Examiner* — Abdelaaziz Tissire
(74) *Attorney, Agent, or Firm* — Perkins Coie LLP (57) ABSTRACT

An image sensing device includes a pixel array; a plurality of lines coupled to the pixel array; a readout circuit coupled to the plurality of lines and structured to output a readout reset signal and a readout data; first readout lines coupled to the readout circuit and structured to transfer readout reset signals and readout data signals; a global counter coupled to count the readout reset signals and the readout data signals; a first storing circuit coupled to the first readout lines to receive the readout reset signals and the readout data signals; a line control circuit coupled to the first storing circuit; second readout lines coupled to the line control circuit and structured to transfer the readout control signals received from the line control circuit; and a second storing circuit coupled to the second readout lines to receive the readout control signals.

21 Claims, 5 Drawing Sheets

IMAGE SENSING DEVICE

CROSS-REFERENCE TO RELATED APPLICATIONS

This patent document claims under 35 U.S.C. § 119 the priority to and benefits of Korean Patent Application number 10-2017-0148123, filed on Nov. 8, 2017, in the Korean Intellectual Property Office, the disclosure of which is incorporated herein by reference in its entirety.

TECHNICAL FIELD

The technology and implementations disclosed in this patent document generally relate to a semiconductor design technique for an electronic device including an image sensing device.

BACKGROUND

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow both analog and digital control circuits to be integrated in a single integrated circuit (IC). CMOS image sensors are widely used in many applications.

SUMMARY

This patent document provides, among others, designs of an image sensing device with an optimized readout path of a pixel signal.

In one aspect, an image sensing device is provided to comprise: a pixel array including one or more pixel groups; a plurality of first readout lines; a readout circuit suitable for outputting a readout reset signal group and a readout data signal group to the first readout lines based on a reset signal group and a data signal group outputted from each of the pixel groups; a global counter suitable for generating global count signals; a first storing circuit suitable for storing a first global count signal group corresponding to the reset signal group and a second global count signal group corresponding to the data signal group based on the readout reset signal group, the readout data signal group and the global count signals; a plurality of second readout lines; a line control circuit suitable for outputting any one of the readout reset signal group and the readout data signal group as a readout control signal group to the second readout lines based on a time-sharing control signal; and a second storing circuit suitable for storing any one of the first global count signal group and the second global count signal group based on the readout control signal group and the global count signals.

In accordance with an embodiment of the disclosed technology, an image sensing device includes: a pixel array including one or more pixel groups, each pixel group generating a reset signal and a data signal; a plurality of lines coupled to the pixel array and structured to transfer reset signals and data signals that are received from pixel groups in the pixel array; a readout circuit coupled to the plurality of lines and structured to output (1) a readout reset signal based on a reset signal from a pixel group during a first period of a control signal and (2) a readout data signal based on a data signal from the pixel group during a second period of the control signal and to cause the control signal to have different logic values during the first period and the second period; first readout lines coupled to the readout circuit and structured to transfer readout reset signals and readout data signals that are associated with the pixel groups in the pixel array and are received from the readout circuit; a global counter coupled to count the readout reset signals and the readout data signals and structured to generate global count signals represented count values in response to the readout reset signals and the readout data signals, respectively; a first storing circuit coupled to the first readout lines to receive the readout reset signals and the readout data signals and further coupled to the global counter to receive and store the count values that correspond to the readout reset signals and the readout data signals; a line control circuit coupled to the first storing circuit and structured to selectively receive the readout reset signals from the readout circuit based on the control signal and to generate readout control signals that respectively correspond to the readout reset signals; second readout lines coupled to the line control circuit and structured to transfer the readout control signals received from the line control circuit; and a second storing circuit coupled to the second readout lines to receive the readout control signals from the line control circuit and further coupled to the global counter to receive and store the count values that correspond to the readout reset signals.

The line control circuit may be structured to selectively couple the second readout lines to a ground voltage terminal.

The line control circuit may be structured to either couple the first readout lines to the second readout lines or separates the first readout lines from the second readout lines based on the control signal.

The line control circuit may couple the first readout lines to the second readout lines during the first period of the control signal and separate the first readout lines from the second readout lines during the second period of the control signal, the second period of the control signal proceeding after the first period of the control signal.

The first storing circuit may be configured to replace the count values that correspond to the readout reset signals with the count values that correspond to the readout data signals.

The first storing circuit may store the count values that correspond to the readout reset signals during the first period of the control signal, and store the count values that correspond to the readout data signals during the second period of the control signal, the second storing circuit may store the count values that correspond to the readout reset signals during the first period and maintain, during the second period of the control signal, the count values that have been stored during the first period.

The reset signal may be transferred before the data signal is transferred.

The second storing circuit may store the count values that correspond to the readout reset signals when the first storing circuit replaces the count values that correspond to the readout reset signals with the count values that correspond to the readout data signals.

The readout circuit may include: a plurality of conversion circuits structured to convert the reset signals into digital typed reset signals and convert the data signals into digital typed data signals; and a plurality of trigger circuits structured to generate the readout reset signals when the reset signals are transited to the digital typed reset signals and the readout data signals when the data signals are transited to the digital typed data signals.

The pixel array may include a plurality of pixels arranged in column and row directions, and each of the pixel groups includes pixels arranged in a same row.

In accordance with an embodiment of the disclosed technology, an image sensing device includes: a pixel generating a reset signal during a readout reset period and a data signal during a readout data period; a global counter coupled to receive a readout reset signal corresponding to the reset signal and a readout data signal corresponding to the data signal and configured to generate global count signals represented count values in response to the readout reset signal and the readout data signal, respectively; a first storing circuit coupled to the global counter to receive and store count values that correspond to the readout reset signal and the readout data signal; and a second storing circuit coupled to the global counter to receive and store count values that correspond to the readout reset signal, wherein the first storing circuit is disposed more adjacent to the pixel than the second storing circuit is.

The image sensing device may further include: a first readout line coupled to the first storing circuit; a conversion circuit located to receive the reset signal and the data signal and configured to convert the reset signal into a digital typed reset signal and convert the data signal into a digital typed data signal; a trigger circuit configured to output the readout reset signal to the first readout line, the readout reset signal activated when the reset signal is transited to the digital typed reset signal, and output the readout data signal to the first readout line, the readout data signal activated when the data signal is transited to the digital typed data signal; a second readout line coupled to the second storing circuit; and a line control circuit located to receive a control signal having different logic values during the readout reset period and the readout data period and configured to selectively receive the readout reset signal from the trigger circuit based on the control signal and to transfer the readout reset signal to the second storing circuit.

The line control circuit may generate a readout control signal that corresponds to the readout reset signal during the readout reset period and couples the second readout line to a ground voltage terminal during the readout data period.

The line control circuit may either couple the first readout line to the second readout line or separate the first readout line from the second readout line based on the control signal.

The line control circuit may couple the first readout line to the second readout line in response to the readout reset signal and separates the first readout line from the second readout line in response to the readout data signal.

The first storing circuit may be configured to replace the count values that correspond to the readout reset signals with the count values that correspond to the readout data signals.

The reset signal may be generated before the data signal is generated.

The first storing circuit may store the count values that correspond to the readout reset signal during the readout reset period, and subsequently store the count values that correspond the readout data signal during the readout data period, the second storing circuit may store the count values that correspond to the readout reset signal during the readout reset period and maintain, during the readout data period, the count values that have been stored during the readout reset period.

The second storing circuit may store the count values that correspond to the readout reset signals when the first storing circuit replaces the count values that correspond to the readout reset signals with the count values that correspond to the readout data signals.

DETAILED DESCRIPTION

Various features and embodiments of the disclosed technology are described below with reference to the accompanying drawings.

Moreover, it is noted that the terminology used herein is selected for the purpose of describing the examples of the disclosed technology only and is not intended to limit the illustrated examples.

The drawings are not necessarily to scale and, in some instances, proportions may have been exaggerated in order to clearly illustrate features of the embodiments.

Figure 1:
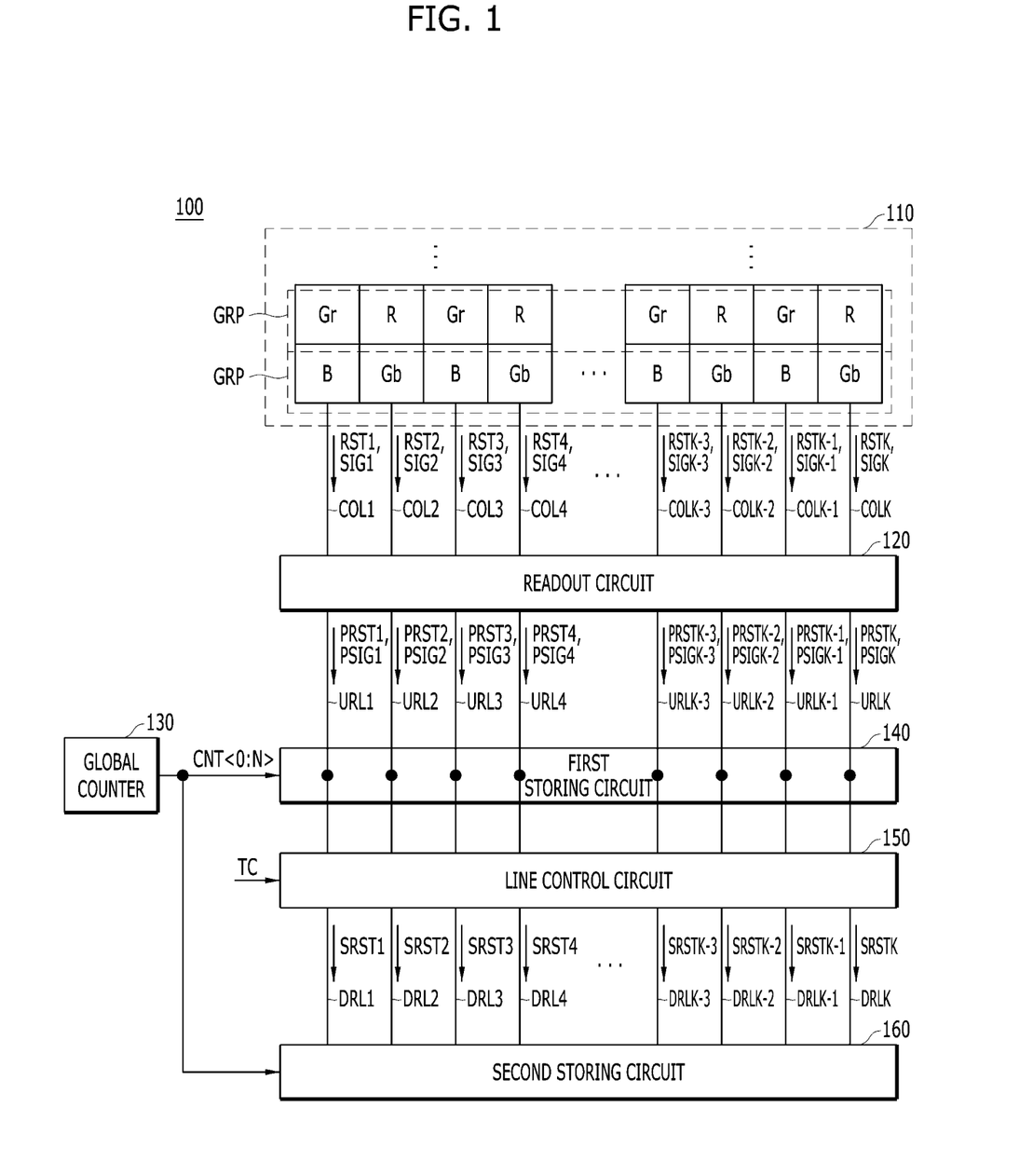
FIG. 1 is a block diagram illustrating an example of an image sensing device based on an embodiment of the disclosed technology.

FIG. 1 is a block diagram illustrating an example of an image sensing device 100 based on the disclosed technology.

Referring to FIG. 1, the image sensing device 100 may include a pixel array 110, first to $K^{th}$ column lines COL1 to COLK, a readout circuit 120, a global counter 130, first to $K^{th}$ upper readout lines URL1 to URLK, a first storing circuit 140, first to $K^{th}$ lower readout lines DRL1 to DRLK, a line control circuit 150, and a second storing circuit 160. The image sensing device 100 may operate based on a control signal TC that controls the image sensing device 100 to perform different operations during reset readout time and data readout time. In some implementations, the control signal TC may be a sequential time-domain control signal having two different logic values, for example, logic high and logic low. In some implementations, the image sensing device 100 proceeds reset operations when the control signal TC has the logic high value and the image sensing device 100 proceeds data reading operations when the control signal TC has the logic low value. Accordingly, the control signal TC controls the routing path for performing the reset operations and the data reading operations. The control signal TC may be generated internally or externally of the imaging sensing device. In some implementations, the data readout time proceeds after the reset readout time.

The pixel array 110 may include a plurality of pixels. The pixels may be arranged in column and row directions. Each pixel is an imaging pixel which responds to received light to produce photo-induced electric charges and produces a pixel signal based on the photo-induced electric charges. To produce color images, the pixel array 110 are structured to include color filters in the pixels, respectively, so that a color filter at a pixel optically filters the incident light to allow filtered light at a designed color to be converted into electric charges by that pixel. A group of adjacent pixels of different colors form a pixel block to filter the incident light in different colors at with each pixel block to capture the color information of the incident light at the pixel block location. The color filter designation for the pixels in the pixel array 110 is designed based on a particular color pattern, such as the well-known Bayer color filter pattern based on an arrangement of red (red), green (G) and blue (B) color filters with 50% green, 25% red and 25% blue in each pixel block.

In some implementations, the pixels may include a color filter array arranged in a Bayer pattern which includes repeated cells of two-by-two pixels having two green color pixels, one red color pixel and one blue color pixel. Under a selected color filter pattern (e.g., the Bayer pattern), the pixels arranged in a same row are referred to as "a pixel group GRP". For the simplicity of the explanations, FIG. 1 shows two rows of pixels as two pixel groups GRPs and each of the pixel groups GRP includes K pixels.

Each of the pixel groups GRP may generate an analog-typed reset signal RST1 to RSTK and an analog-typed data signal SIG1 to SIGK. In some implementations, the analog-typed reset signals RST1 to RSTK are generated during the reset readout time and the analog-typed data signals SIG1 to SIGK are generated during the data readout time. The analog-typed reset signals RST1 to RSTK and the analog-typed data signals SIG1 to SIGK may be sequentially generated. The reset signals generated by the pixel groups GRP include first to $K^{th}$ reset signals RST1 to RSTK, which form a reset signal group, and the analog data signals generated by the pixel groups GRP include first to $K^{th}$ data signals SIG1 to SIGK, which form a data signal group. Although not shown in FIG. 1, the image sensing device 110 may further include a row control circuit to activate a corresponding pixel group GRP during a unit row time. Each of the pixel groups GRP may simultaneously generate the analog typed first to $K^{th}$ reset signals RST1 to RSTK during the reset readout time of the unit row time, and may simultaneously generate the analog typed first to $K^{th}$ data signals SIG1 to SIGK during the data readout time of the unit row time.

The signals generated by the pixel groups GRP, which include the reset signals RST1 to RSTK and the data signals SIG1 to SIGK, are transferred from the pixel array 110 to the readout circuit 120 through the first to $K^{th}$ column lines COL1 to COLK. In FIG. 1, the column lines COL1 to COLK may be arranged or coupled between the pixel array 110 and the readout circuit 120. The first to $K^{th}$ column lines COL1 to COLK may transfer the first to $K^{th}$ reset signals RST1 to RSTK and the first to $K^{th}$ data signals SIG1 to SIGK, which are generated from each of the pixel groups GRP, to the readout circuit 120. Each of the first to $K^{th}$ column lines COL1 to COLK may be shared by pixels arranged in the column direction among the pixels.

The readout circuit 120 may receive the reset signals RST1 to RSTK and the data signals SIG1 to SIGK and generate first to $K^{th}$ readout reset signals PRST1 to PRSTK and first to $K^{th}$ readout data signals PSIG1 to PSIGK based on the first to $K^{th}$ reset signals RST1 to RSTK and the first to $K^{th}$ data signals SIG1 to SIGK. The first to $K^{th}$ readout reset signals PRST1 to PRSTK form a readout reset signal group and the first to $K^{th}$ readout data signals PSIG1 to PSIGK form a readout data signal group. The readout circuit 120 will be described in detail below with reference to FIG. 2.

The global counter 130 may generate global count signals CNT_OUT and may be arranged to provide the global count signals CNT_OUT to represent count values in response to the readout reset signals and the readout data signals. The count values that are counted during the reset readout time may be stored in the first storing circuit 140 and the second storing circuit 160. The count values that are counted during the data readout time may be stored (i.e., be overwritten or rewritten) in the first storing circuit 140.

The first to $K^{th}$ upper readout lines URL1 to URLK may be coupled between the readout circuit 120 and the first storing circuit 140. In some implementations, the first to $K^{th}$ upper readout lines URL1 to URLK may be further extended from the first storing circuit 140 to be coupled to the line control circuit 150. The first to $K^{th}$ upper readout lines URL1 to URLK may transfer the first to $K^{th}$ readout reset signals PRST1 to PRSTK and the first to $K^{th}$ readout data signals PSIG1 to PSIGK to the first storing circuit 140 and the line control circuit 150.

The first storing circuit 140 may be coupled to the readout circuit 120 and designed to receive the first to $K^{th}$ readout reset signals PRST1 to PRSTK and the first to $K^{th}$ data reset signals PSIG1 to PSIGK from the readout circuit 120. The first storing circuit 140 may be coupled to the global counter 130 to receive and store the count values that correspond to the first to $K^{th}$ readout reset signals PRST1 to PRSTK and the count values that correspond to the first to $K^{th}$ readout data signals PSIG1 to PSIGK. The first storing circuit 140 may receive, during the reset readout time, the first to $K^{th}$ readout reset signals PRST1 to PRSTK, and the global count signals CNT_OUT, and receive, during the data readout time, the first to $K^{th}$ readout data signals PSIG1 to PSIGK, and the global count signals CNT_OUT. During the reset readout time, the first storing circuit 140 may store count values that are counted in response to receiving the first to $K^{th}$ readout reset signals PRST1 to PRSTK. During the data readout time, the first storing circuit 140 may store count values that are counted in response to receiving the first to $K^{th}$ readout data signals PSIG1 to PSIGK. The operations of counting values in response to the signals from the pixel array 110 using the global counter are known in the art and thus, the detailed explanations are omitted. The line control circuit 150 may be connected to the first to $K^{th}$ upper readout lines URL1 to URLK and located to couple or separate the first to $K^{th}$ upper readout lines URL1 to URLK and the first to $K^{th}$ lower readout lines DRL1 to DRLK based on the control signal TC. The control signal TC is provided to have different logic values to cause two different operations to sequentially perform in the reset readout time and the data readout time, respectively. For example, the line control circuit 150 may couple the first to $K^{th}$ upper readout lines URL1 to URLK to the first to $K^{th}$ lower readout lines DRL1 to DRLK when the first to $K^{th}$ readout reset signals PRST1 to PRSTK are outputted (i.e., during the reset readout time), and disconnect or separate the first to $K^{th}$ upper readout lines URL1 to URLK from the first to $K^{th}$ lower readout lines DRL1 to DRLK when the first to $K^{th}$ readout data signals PSIG1 to PSIGK are outputted (i.e., during the data readout time). The line control circuit 150 may selectively receive the first to $K^{th}$ readout reset signals PRST1 to PRSTK based on the control signal and generate first to $K^{th}$ readout control signals SRST1 to SRSTK that respectively correspond to the first to $K^{th}$ readout reset signals PRST1 to PRSTK. The detailed operations of the line control circuit 150 based on the control signal TC will be further discussed with regard to FIGS. 3 to 5.

The first to $K^{th}$ lower readout lines DRL1 to DRLK may be coupled between the line control circuit 150 and the second storing circuit 160. The first to $K^{th}$ lower readout lines DRL1 to DRLK may transfer first to $K^{th}$ readout control signals SRST1 to SRSTK from the line control circuit to the second storing circuit 160. The first to $K^{th}$ readout control signals SRST1 to SRSTK are further explained later with regard to FIGS. 3 and 4.

The second storing circuit 160 may receive the first to $K^{th}$ readout control signals SRST1 to SRSTK, and the global count signals CNT_OUT. The second storing circuit 160 may be coupled to the global counter 130 to receive and store the count values that correspond to the first to $K^{th}$ readout control signals SRST1 to SRSTK which correspond to first to $K^{th}$ readout reset signals PRST1 to PRSTK. Unlike the first storing circuit 140, readout reset signals are provided to the second storing circuit 160. During the data readout time, since there is no readout data signal provided to the second storing circuit 160, the second storing circuit 160 may maintain or store the previously stored values. In some implementations, when the data readout time proceeds after the reset readout time, the second storing circuit 160 stores, during the reset readout time, the count values that correspond to the first to $K^{th}$ readout reset signals PRST1 to PRSTK and, maintains, during the data readout time, the count values that have been already stored during the reset readout time.

Between the first storing circuit 140 and the second storing circuit 160, the first storing circuit 140 may be disposed closer to the pixel array 110 and the readout circuit 120 than the second storing circuit 160 is. This configuration allows, after a cycle including the reset readout time and the data readout time, (1) that the count values that correspond to the first to $K^{th}$ readout reset signals PRST1 to PRSTK are stored in the second storing circuit 160 which is disposed relatively away from the pixel array 110 and the readout circuit 120 and (2) that the count values that correspond to the first to $K^{th}$ readout data signals are stored in the first storing circuit 140 which is disposed relatively closer to the pixel array 110 and the readout circuit 120. Assume that, during the reset readout time, the readout circuit 120 outputs the readout reset signals PRST1 to PRSTK. In this case, the first storing circuit 140 stores the count values that correspond to the first to $K^{th}$ readout reset signals PRST1 to PRSTK and the second storing circuit 160 stores the count values that correspond to the first to $K^{th}$ readout control signals SRST1 to SRSTK. Since the readout control signals SRST1 to SRSTK correspond to the readout reset signals PRST1 to PRSTK, the count values stored in the second circuit 160 also correspond to the first to $K^{th}$ readout reset signals PRST1 to PRSTK. After the reset readout time, the readout circuit 120 outputs the data readout signals PSIG1 to PSIGK during the data readout time. In this case, the first storing circuit 140 stores the count values that correspond to the first to $K^{th}$ readout data signals PSIG1 to PSIGK. Since the first to $K^{th}$ readout reset counts are maintained in the second storing circuit 160. Since no readout data signal is provided to the second storing circuit 160, the second storing circuit 160 maintains the count values that correspond to the first to $K^{th}$ readout reset signals PRST1 to PRSTK and have been already stored during the reset readout time.

Figure 2:
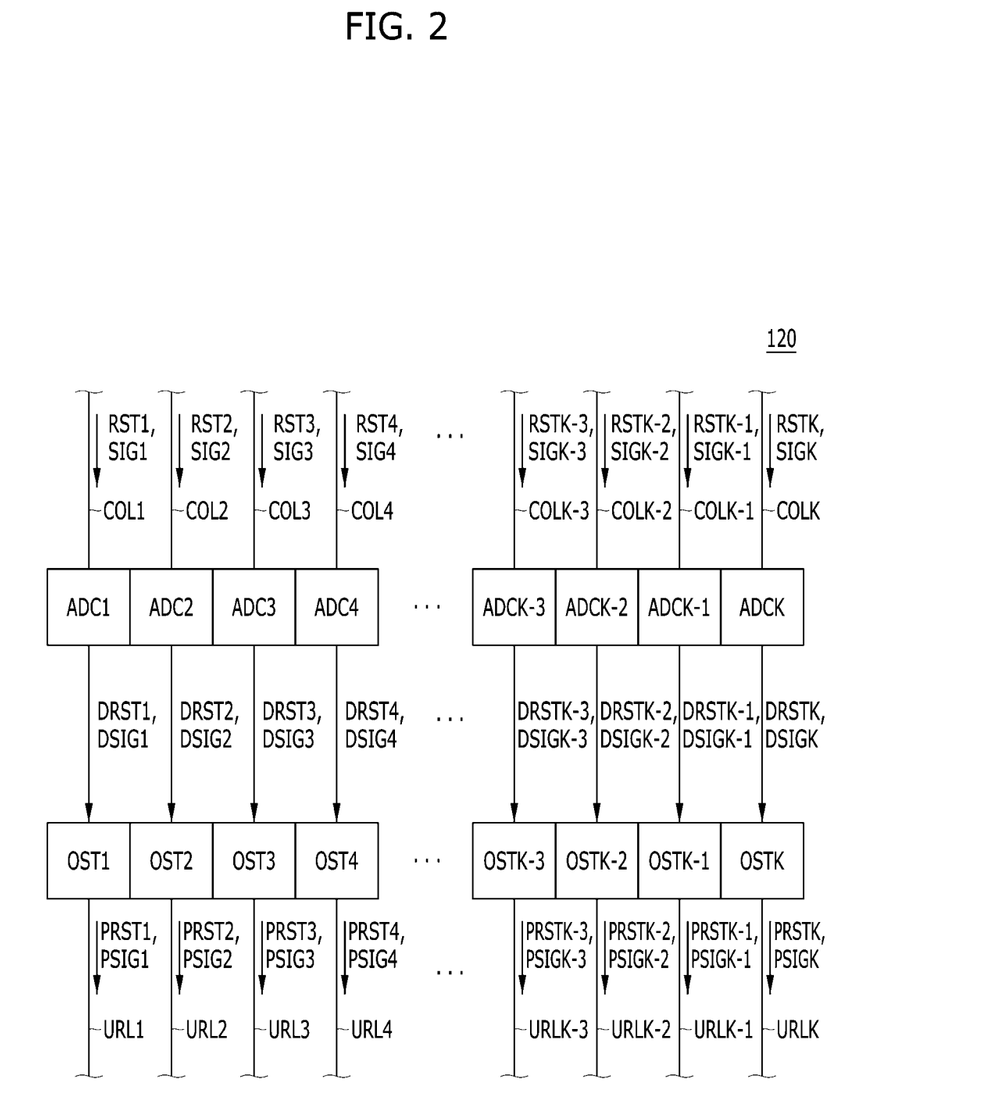
FIG. 2 is a block diagram illustrating an example of a readout circuit based on an embodiment of the disclosed technology.

FIG. 2 is an example of the block diagram illustrating the readout circuit 120 shown in FIG. 1.

Referring to FIG. 2, the readout circuit 120 may include first to $K^{th}$ conversion blocks ADC1 to ADCK and first to $K^{th}$ trigger blocks OST1 to OSTK.

The first to $K^{th}$ conversion blocks ADC1 to ADCK may receive the analog typed reset signals RST1 to RSTK and the analog typed data signals SIG1 to SIGK through the first to $K^{th}$ column lines COL1 to COLK. The first to $K^{th}$ conversion blocks ADC1 to ADCK may convert the analog typed first to $K^{th}$ reset signals RST1 to RSTK into a digital typed first to $K^{th}$ reset signals DRST1 to DRSTK, and convert the analog typed first to $K^{th}$ data signals SIG1 to SIGK into the digital typed first to $K^{th}$ data signals DSIG1 to DSIGK. For example, the first conversion block ADC1 may compare the analog typed first reset signal RST1 with a reset-use ramp signal (not illustrated), and when the result of the comparison shows that a voltage level of the first reset signal RST1 coincides with a voltage level of the reset-use ramp signal, the first conversion block ADC1 may perform the transition of the analog typed first reset signal RST1 to the digital typed first reset signal DRST1. Also, the first conversion block ADC1 may compare the analog typed first data signal SIG1 with a data-use ramp signal (not illustrated), and when the result of the comparison shows that a voltage level of the first data signal SIG1 coincides with a voltage level of the data-use ramp signal, the first conversion block ADC1 may perform the transition of the analog typed first data signal SIG1 to the digital typed first data signal DSIG1. For example, each of the first to $K^{th}$ conversion blocks ADC1 to ADCK may include an analog-to-digital (AD) converter.

The first to $K^{th}$ trigger blocks OST1 to OSTK may generate the first to $K^{th}$ readout reset signals PRST1 to PRSTK which are activated at which the analog typed first to $K^{th}$ reset signals RST1 to RSTK are transited to the digital typed first to $K^{th}$ reset signals DRST1 to DRSTK, and generate the first to $K^{th}$ readout data signals PSIG1 to PSIGK which are activated at which the analog typed first to $K^{th}$ data signals SIG1 to SIGK are transited to the digital type of first to $K^{th}$ data signals DSIG1 to DSIGK. For example, the first trigger block OST1 may generate the first readout reset signal PRST1 that pulses at the time of the transition of the analog typed first reset signal RST1 to the digital typed first reset signal DRST1, and generate the first readout data signal PSIG1 that pulses at the time of the transition of the analog typed first data signal SIG1 to the digital typed first data signal DSIG1. The signals generated by the first to $K^{th}$ trigger blocks OST1 to OSTK are transferred through the first to $K^{th}$ upper readout lines URL1 to URLK.

Figure 3:
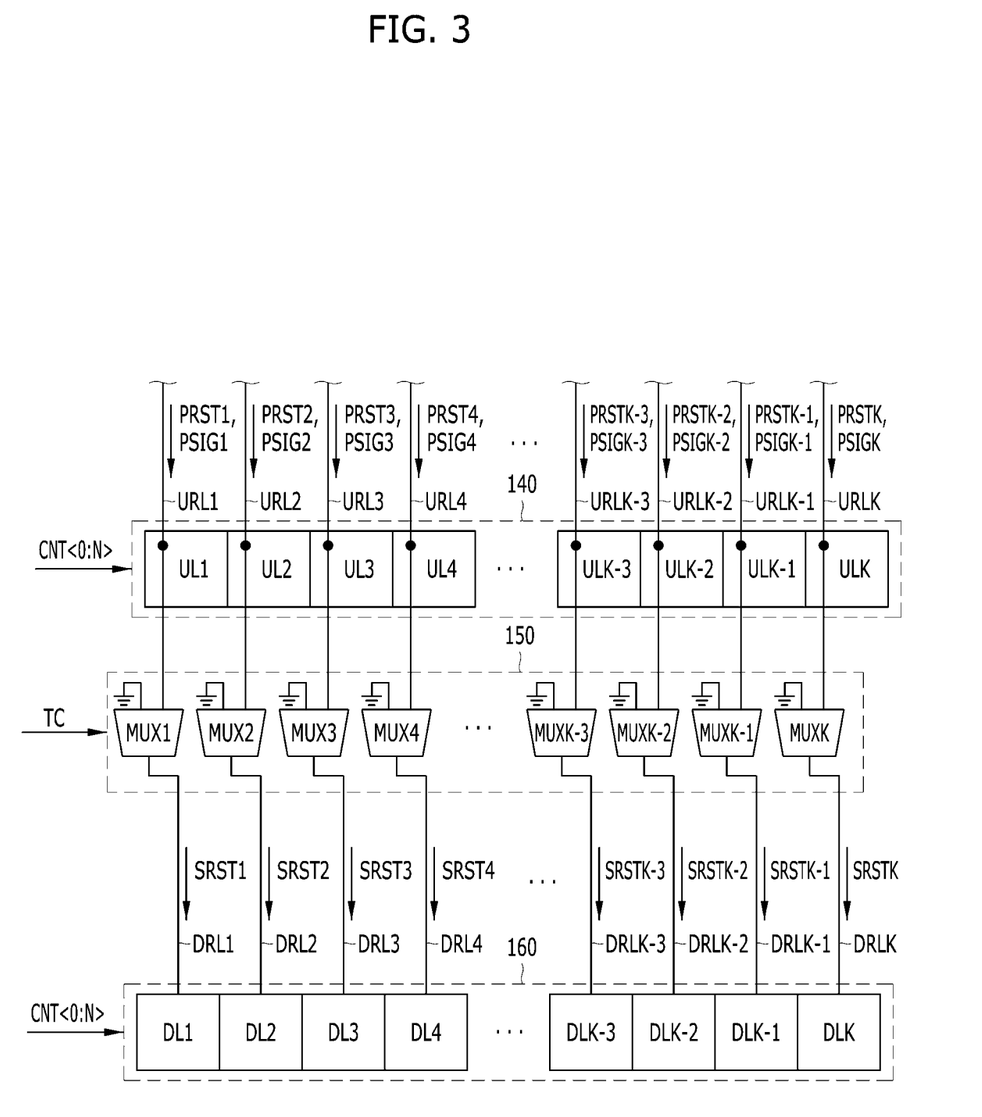
FIG. 3 is a block diagram illustrating examples of a first storing circuit, a line control circuit and a second storing circuit based on an embodiment of the disclosed technology.

FIG. 3 shows examples of the block diagrams illustrating the first storing circuit 140, the line control circuit 150 and the second storing circuit 160, which are shown in FIG. 1.

Referring to FIG. 3, the first storing circuit 140 may include first to $K^{th}$ upper storing blocks UL1 to ULK. During the reset readout time, the first to $K^{th}$ upper storing blocks UL1 to ULK may store the count values that correspond to the first to $K^{th}$ readout reset signals PRST1 to PRSTK, respectively. During the data readout time, the first to $K^{th}$ upper storing blocks UL1 to ULK may store the count values that correspond to the first to $K^{th}$ readout data signals PSIG1 to PSIGK, respectively. In an implementation that the data readout time proceeds after the reset readout time, the count values corresponding to the first readout reset signal PRST1 may be firstly written to the first upper storing block UL1 during the reset readout time, and subsequently the count values corresponding to the first readout data signal PSIG1 may be overwritten or rewritten to the first upper storing block UL1 during the data readout time. In this manner, as the data readout time proceeds after the reset readout time, the first to $K^{th}$ upper storing blocks UL1 to ULK store the count values corresponding to the first to $K^{th}$ readout data signals PSIG1 to PSIGK, respectively. As will be discussed, the count values corresponding to the first to $K^{th}$ readout reset signals PRST1 to PRSTK, which are stored in the first storage circuit 140 during the reset readout time but replaced with the count values corresponding to the first to $K^{th}$ readout data signals PSIG1 to PSIGK during the data readout time, can be stored in the second storage circuit 160.

The line control circuit 150 may include first to $K^{th}$ line control blocks MUX1 to MUXK. The first to $K^{th}$ line control blocks MUX1 to MUXK may couple the first to $K^{th}$ upper readout lines URL1 to URLK to the first to $K^{th}$ lower readout lines DRL1 to DRLK (refer to FIG. 4) or couple the first to $K^{th}$ lower readout lines DRL1 to DRLK to a ground voltage terminal (refer to FIG. 5) based on the control signal TC. For example, each of the first to $K^{th}$ line control blocks MUX1 to MUXK may include a multiplexer and is coupled to have two inputs: a grounded input and an input from a corresponding line of the upper readout lines URL1 to URLK so that each multiplexer (MUX1 through MUXK) can, in response to the control signal TC, connect either the ground or the signal in a corresponding line of the upper readout lines URL1 to URLK to a corresponding one of the lower readout lines DRL1 to DRLK.

The second storing circuit 160 may include first to $K^{th}$ lower storing blocks DL1 to DLK. Each of the first to $K^{th}$ lower storing blocks DL1 to DLK may store the count values corresponding to the first to $K^{th}$ readout control signals SRST1 to SRSTK transferred from the first to $K^{th}$ line control blocks MUX1 to MUXK of the line control circuit 150. Since the first to $K^{th}$ readout control signals SRST1 to SRSTK correspond to the first to $K^{th}$ readout reset signals PRST1 to PRSTK, respectively, the count values stored in the second storing circuit 160 may correspond to the first to $K^{th}$ readout reset signals PRST1 to PRSTK as well. For example, during the reset readout time (refer to FIG. 4), the first lower storing block DL1 may store the count values corresponding to the first readout control signal SRST1 corresponding to the first readout reset signal PRST1. As will be further discussed with regard to FIG. 5, the count values stored in the first lower storing block DL1 during the reset readout time may maintain in the first lower storing block DL1 during the data readout time.

Figure 4:
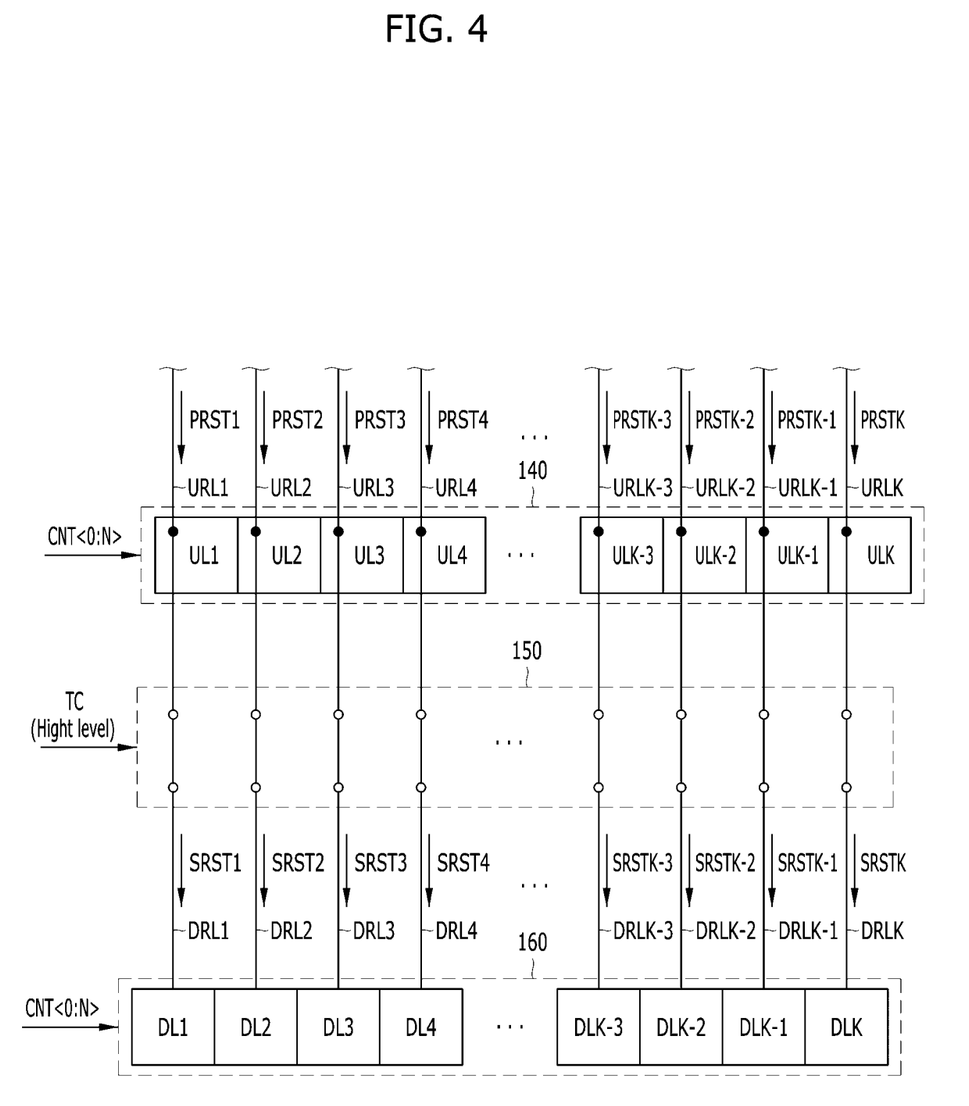
FIGS. 4 and 5 are examples of the block diagrams illustrating the first storing circuit, the line control circuit and the second storing circuit illustrated in FIG. 3.
Figure 5:
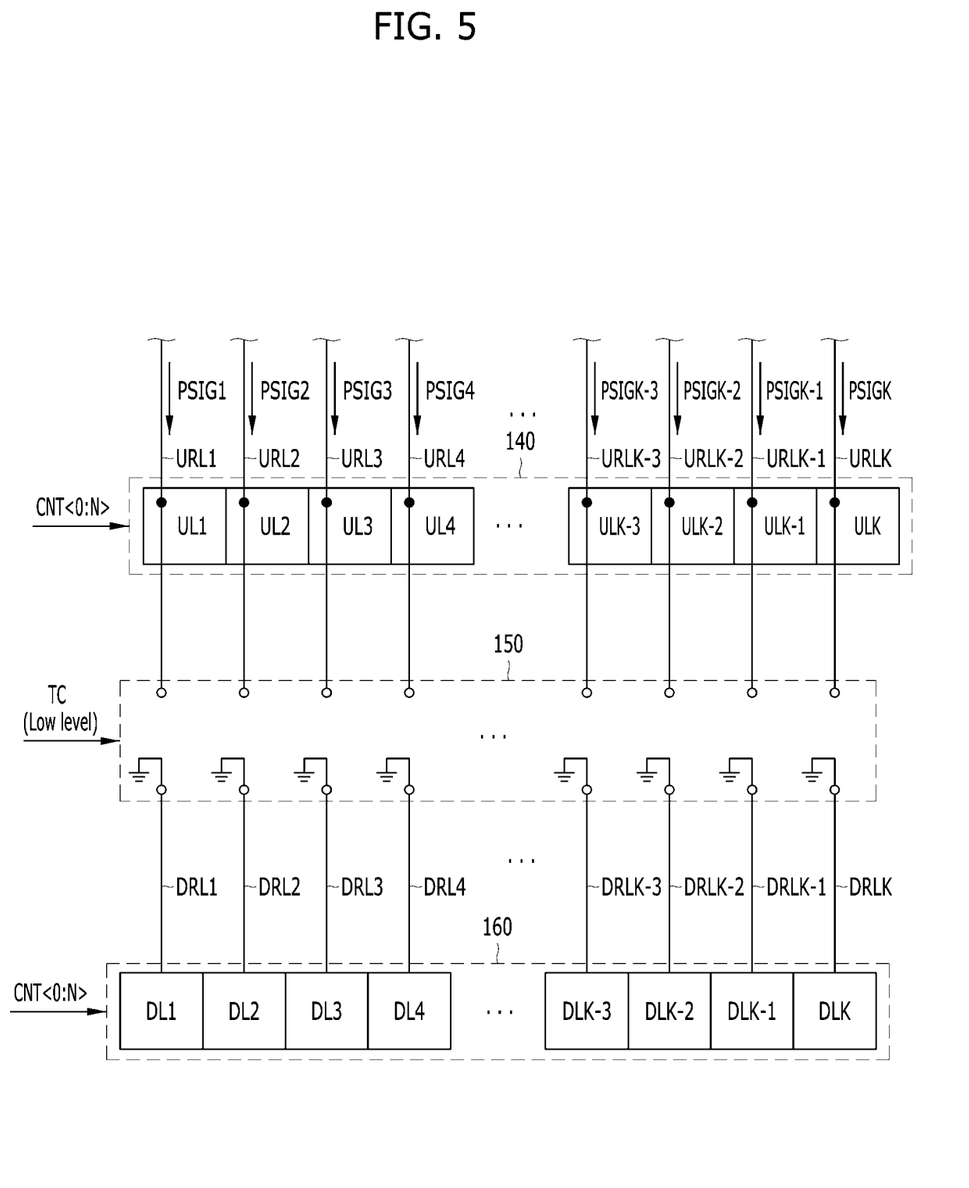

FIGS. 4 and 5 are examples of block diagrams illustrating operations of the first storing circuit 140, the line control circuit 150 and the second storing circuit 160 which are illustrated in FIG. 3. FIG. 4 shows the implementation during the reset readout time when the readout reset signals PRST1 to PRSTK are transferred to the first storing circuit 140 and the readout control signals SRST1 to SRSTK corresponding to the readout reset signals PRST1 to PRSTK are transferred to the second storing circuit 160. In FIG. 4, the first to $K^{th}$ upper readout lines URL1 to URLK and first to $K^{th}$ lower readout lines DRL1 to DRLK are electrically coupled to each other. Unlike FIG. 4, FIG. 5 shows the implementation that the first to $K^{th}$ upper readout lines URL1 to URLK are electrically separated from each other from the first to $K^{th}$ lower readout lines DRL1 to DRLK.

Referring to FIG. 4, the line control circuit 150 may couple the first to $K^{th}$ upper readout lines URL1 to URLK to the first to $K^{th}$ lower readout lines DRL1 to DRLK, respectively, during the reset readout time based on the control signal TC. When the line control circuit 150 is located between the first to $K^{th}$ upper readout lines URL1 to URLK and the first to $K^{th}$ lower readout lines DRL1 to DRLK, the control signal TC is set to sequentially have two different logic levels, for example, logic high and logic low levels. Depending on the logic level of the control signal TC, the line control circuit 150 may control the MUX1 through MUXK inside the line control circuit 150 to perform different operations in the reset readout time and the data readout time by either connecting the first to $K^{th}$ upper readout lines URL1 to URLK to the first to $K^{th}$ lower readout lines DRL1 to DRLK, respectively, or grounding the first to $K^{th}$ lower readout lines DRL1 to DRLK.

The implementation shown in FIG. 4 shows the example of the configuration during the reset readout time that the MUX1 to MUXK in the line control circuit 150 connect the first to $K^{th}$ upper readout lines URL1 to URLK to the first to $K^{th}$ lower readout lines DRL1 to DRLK, respectively. In some implementations, the control signal TC may have a logic high level to connect the first to $K^{th}$ upper readout lines URL1 to URLK to the first to $K^{th}$ lower readout lines DRL1 to DRLK, respectively. Accordingly, during the reset readout time, the first to $K^{th}$ readout reset signals PRST1 to PRSTK may be applied to the first to $K^{th}$ upper storing blocks UL1 to ULK, and the first to $K^{th}$ readout control signals SRST1 to SRSTK corresponding to the first to $K^{th}$ readout reset signals PRST1 to PRSTK may be applied to the first to $K^{th}$ lower storing blocks DL1 to DLK.

FIG. 5 shows the implementation during the data readout time when the readout data signals PSIG1 to PSIGK are transferred to the first storing circuit 140. Referring to FIG. 5, the line control circuit 150 may separate the first to $K^{th}$ upper readout lines URL1 to URLK from the first to $K^{th}$ lower readout lines DRL1 to DRLK, respectively, during the data readout time based on the control signal TC. When the line control circuit 150 separates the first to $K^{th}$ upper readout lines URL1 to URLK from the first to $K^{th}$ lower readout lines DRL1 to DRLK, the control signal TC may have a logic low level.

Accordingly, during the data readout time, the first to $K^{th}$ upper storing blocks UL1 to ULK may receive the first to $K^{th}$ readout data signals PSIG1 to PSIGK. As shown in FIG. 5, the line control circuit 150 may receive the control signal TC having a logic low level. In response to the control signal TC having the logic low level, the line control circuit 150 operates to connect each of the $K^{th}$ lower readout lines DRL1 to DRLK to a ground voltage.

Hereinafter, an operation of the image sensing device 100 having the aforementioned structure in accordance with the embodiment of the disclosed technology is described. For the sake of convenience in the descriptions, the descriptions are provided for one pixel group GRP included in the pixel array 110.

An operation of the image sensing device 100 performed during the reset readout time of the unit row time is described.

During the reset readout time, the pixel group GRP may output the analog typed first to $K^{th}$ reset signals RST1 to RSTK, which form the reset signal group. In some implementations, the first to $K^{th}$ reset signals RST1 to RSTK are simultaneously outputted. The first to $K^{th}$ reset signals RST1 to RSTK, which are outputted from the pixel group GRP, is transferred to the readout circuit 120 through the first to $K^{th}$ column lines COL1 to COLK during the reset readout time.

The readout circuit 120, which receives the first to $K^{th}$ reset signals RST1 to RSTK from the pixel array 110, may output the first to $K^{th}$ readout reset signals PRST1 to PRSTK, which form the readout reset signal group, based on the first to $K^{th}$ reset signals RST1 to RSTK. The first to $K^{th}$ readout reset signals PRST1 to PRSTK, which are outputted from the readout circuit 120, may be transferred to the first storing circuit 140 through the first to $K^{th}$ upper readout lines URL1 to URLK. As described with regard to FIG. 2, the first to $K^{th}$ conversion blocks ADC1 to ADCK may convert the analog typed first to $K^{th}$ reset signals RST1 to RSTK into the digital typed first to $K^{th}$ reset signals DRST1 to DRSTK. For example, the first conversion block ADC1 may compare the analog typed first reset signal RST1 with the reset-use ramp signal, and when the result of the comparison shows that the voltage level of the first reset signal RST1 coincides with the voltage level of the reset-use ramp signal, the first conversion block ADC1 may perform the transition of the analog typed first reset signal RST1 to the digital typed first reset signal DRST1. The first to $K^{th}$ trigger blocks OST1 to OSTK may generate the first to $K^{th}$ readout reset signals PRST1 to PRSTK at which the analog typed first to $K^{th}$ reset signals RST1 to RSTK are transited to the digital typed first to $K^{th}$ reset signals DRST1 to DRSTK. For example, the first trigger block OST1 may generate the first readout reset signal PRST1 that pulses at the time of the transition of the analog typed first reset signal RST1 to the digital typed first reset signal DRST1.

During the reset readout time, the first storing circuit 140 may store count values in response to receiving the first to $K^{th}$ readout reset signals PRST1 to PRSTK based on the global count signals CNT_OUT. For example, the first upper storing block UL1 may latch or hold the count values in response to receiving the first readout reset signal PRST1 based on the global count signal CNT_OUT. The global count signals CNT_OUT may be provided by the global counter 130 during the reset readout time to represent count values in response to receiving the first to $K^{th}$ readout reset signals PRST1 to PRSTK.

During the reset readout time, the line control circuit 150 may couple the first to $K^{th}$ upper readout lines URL1 to URLK to the first to $K^{th}$ lower readout lines DRL1 to DRLK based on the control signal TC, and output the first to $K^{th}$ readout control signals SRST1 to SRSTK corresponding to the first to $K^{th}$ readout reset signals PRST1 to PRSTK. The first to $K^{th}$ readout reset signals PRST1 to PRSTK, which are outputted from the line control circuit 150, may be transferred to the second storing circuit 160 through the first to $K^{th}$ lower readout lines DRL1 to DRLK. For example, the first line control block MUX1 may couple the first upper readout line URL1 to the first lower readout line DRL1 based on the control signal TC having the logic high level (refer to FIG. 4), and output the first readout control signal SRST1 corresponding to the first readout reset signal PRST1. The first readout reset signal PRST1 may be transferred through the first lower readout line DRL1 to the second storing circuit 160.

During the reset readout time, the second storing circuit 160 may store count values in response to receiving the first to $K^{th}$ readout control signals SRST1 to SRSTK based on the global count signals CNT_OUT. For example, the first lower storing block DL1 may latch or hold the count values in response to receiving the first readout control signal SRST1 based on the first global count signal CNT_OUT. The global count signals CNT_OUT may be provided by the global counter 130 during the reset readout time to represent count values in response to receiving the first to $K^{th}$ readout control signals PRST1 to PRSTK.

An operation of the image sensing device performed during the data readout time of the unit row time is described.

During the data readout time, the pixel group GRP may output the analog typed first to $K^{th}$ data signals SIG1 to SIGK, which form the data signal group. In some implementations, the first to $K^{th}$ data signals SIG1 to SIGK are simultaneously outputted. The first to $K^{th}$ data signals SIG1 to SIGK, which are outputted from the pixel group GRP, is transferred to the readout circuit 120 through the first to $K^{th}$ column lines COL1 to COLK during the data readout time.

The readout circuit 120, which receives the first to $K^{th}$ data signals SIG1 to SIGK from the pixel array 110, may output the first to $K^{th}$ readout data signals PSIG1 to PSIGK, which form the readout data signal group, based on the first to $K^{th}$ data signals SIG1 to SIGK. The first to $K^{th}$ readout data signals PSIG1 to PSIGK, which are outputted from the readout circuit 120, may be transferred to the first storing circuit 140 through the first to $K^{th}$ upper readout lines URL1 to URLK. As described with regard to FIG. 2, the first to $K^{th}$ conversion blocks ADC1 to ADCK may convert the analog typed first to $K^{th}$ data signals SIG1 to SIGK into the digital typed first to $K^{th}$ data signals DSIG1 to DSIGK. For example, the first conversion block ADC1 may compare the analog typed first data signal SIG1 with the data-use ramp signal, and when the result of the comparison shows that the voltage level of the first data signal SIG1 coincides with the voltage level of the data-use ramp signal, the first conversion block ADC1 may perform the transition of the analog typed first data signal SIG1 to the digital typed first data signal DSIG1. The first to $K^{th}$ trigger blocks OST1 to OSTK may generate the first to $K^{th}$ readout data signals PSIG1 to PSIGK at which the analog typed first to $K^{th}$ data signal DSIG1 to DIGK are transited to the digital typed first to $K^{th}$ data signals DSIG1 to DSIGK. For example, the first trigger block OST1 may generate the first readout data signal PSIG1 that pulses at the time of the transition of the analog typed first data signal SIG1 to the digital typed first data signal DSIG1.

During the data readout time, the first storing circuit 140 may store the count values in response to receiving the first to $K^{th}$ readout data signals PSIG1 to PSIGK based on the global count signals CNT_OUT. For example, the first upper storing block UL1 may latch or hold the count values in response to receiving the first readout data signal PSIG1 based on the first global count signal CNT_OUT. The global count signals CNT_OUT may be provided by the global counter 130 during the data readout time to represent count values in response to receiving the first to $K^{th}$ readout data signals PSIG1 to PSIGK.

During the data readout time, the line control circuit 150 may separate the first to $K^{th}$ upper readout lines URL1 to URLK from the first to $K^{th}$ lower readout lines DRL1 to DRLK based on the time-sharing control signal TC having the logic low level. In this case, the ground voltage is provided to the first to $K^{th}$ lower readout lines DRL1 to DRLK. For example, the first line control block MUX1 may couple the ground voltage terminal to the first lower readout line DRL1 based on the time-sharing control signal TC having the logic low level (refer to FIG. 5).

When the lower readout lines DRL1 to DRLK are connected to the ground level terminal, the second storing circuit 160 may maintain the count values that were stored during the reset readout time, which are counted in response to receiving the first to $K^{th}$ readout control signals SRST1 to SRSTK. For example, the first lower storing block DL1 may maintain the count values that were stored during the reset readout time in response to receiving the first readout control signal SRST1. In this manner, during the data readout time, the second storing circuit 160 may maintain the count values that were previously stored during the reset readout time.

In accordance with the embodiments of the disclosed technology, the signals including the readout reset signals and the readout data signals can be transferred through a single readout line based on a time-sharing scheme, whereby the readout line coupled to the first and second storing circuits may be optimally routed.

As the readout line included in the readout paths is optimally routed, design complexity may be reduced even at a narrow pixel pitch.

According to the embodiments, an implantation process and/or a deep trench isolation formation process for optical and electrical insulation between the unit pixels can be omitted and/or skipped. Accordingly, a dark current, a hot pixel effect, a dark shading effect, or certain other parameters of the unit pixels of the image sensor can be decreased and suppressed. Furthermore, occupied sizes of the unit pixels of the image sensor can be downsized, and a resolution of the image sensor can be improved.

While the disclosed technology has been described with respect to the specific examples and embodiments, the disclosed technology can be implemented in various ways beyond the specifics of the examples and embodiments described herein.

What is claimed is:

1. An image sensing device, comprising:
a pixel array including one or more pixel groups, each pixel group generating a reset signal and a data signal;
a plurality of lines coupled to the pixel array and structured to transfer reset signals and data signals that are received from pixel groups in the pixel array;
a readout circuit coupled to the plurality of lines and structured to output (1) a readout reset signal based on a reset signal from a pixel group during a first period of a control signal and (2) a readout data signal based on a data signal from the pixel group during a second period of the control signal, the control signal having different logic values during the first period and the second period and the second period proceeding after the first period;
first readout lines directly coupled to the readout circuit and structured to transfer readout reset signals and readout data signals that are associated with the pixel groups in the pixel array and are received from the readout circuit;
a global counter coupled to count the readout reset signals and the readout data signals and structured to generate global count signals represented count values in response to the readout reset signals and the readout data signals, respectively;
a first storing circuit directly coupled to the first readout lines to receive the readout reset signals and the readout data signals and further coupled to the global counter to receive and store the count values that correspond to the readout reset signals and the readout data signals;
a line control circuit coupled to the first storing circuit and structured to selectively receive the readout reset signals from the readout circuit based on the control signal and to generate readout control signals that respectively correspond to the readout reset signals;
second readout lines directly coupled to the line control circuit and structured to transfer the readout control signals received from the line control circuit; and
a second storing circuit directly coupled to the second readout lines to receive the readout control signals from the line control circuit and further coupled to the global counter to receive and store the count values that correspond to the readout reset signals,
wherein the line control circuit is configured to couple the first readout lines to the second readout lines during the first period of the control signal and to separate the first readout lines from the second readout lines during the second period of the control signal.

2. The image sensing device of claim 1, wherein the line control circuit is configured to couple the first readout lines to the second readout lines during the first period of the control signal and to couple the second readout lines to the ground voltage during the second period of the control signal.

3. The image sensing device of claim 1, wherein the second period of the control signal proceeds after the first period of the control signal.

4. The image sensing device of claim 1, wherein the first storing circuit is configured to replace the count values that correspond to the readout reset signals with the count values that correspond to the readout data signals.

5. The image sensing device of claim 1,
wherein the first storing circuit stores the count values that correspond to the readout reset signals during the first period of the control signal, and stores the count values that correspond to the readout data signals during the second period of the control signal,
wherein the second storing circuit stores the count values that correspond to the readout reset signals during the first period and maintains, during the second period of the control signal, the count values that have been stored during the first period.

6. The image sensing device of claim 1, wherein the reset signal is transferred before the data signal is transferred.

7. The image sensing device of claim 1, wherein the second storing circuit stores the count values that correspond to the readout reset signals when the first storing circuit replaces the count values that correspond to the readout reset signals with the count values that correspond to the readout data signals.

8. The image sensing device of claim 1, wherein the readout circuit includes:
a plurality of conversion circuits structured to convert the reset signals into digital typed reset signals and convert the data signals into digital typed data signals; and
a plurality of trigger circuits structured to generate the readout reset signals when the reset signals are transited to the digital typed reset signals and the readout data signals when the data signals are transited to the digital typed data signals.

9. The image sensing device of claim 1, wherein the pixel array includes a plurality of pixels arranged in column and row directions, and each of the pixel groups includes pixels arranged in a same row.

10. The image sensing device of claim 1, wherein the first storing block is disposed more adjacent to the pixel array than the second storing block is.

11. An image sensing device, comprising:
a pixel generating a reset signal during a readout reset period and a data signal during a readout data period, wherein the readout data period proceeds after the readout reset period;
a global counter coupled to receive a readout reset signal corresponding to the reset signal and a readout data signal corresponding to the data signal and configured to generate global count signals represented count values in response to the readout reset signal and the readout data signal, respectively;
a first storing circuit coupled to the global counter to receive and store count values that correspond to the readout reset signal and the readout data signal; and
a second storing circuit coupled to the global counter to receive and store count values that correspond to the readout reset signal,
wherein a first distance between the first storing circuit and the pixel is shorter than a second distance between the second storing circuit and the pixel.

12. The image sensing device of claim 11, further comprising:
a first readout line coupled to the first storing circuit;
a conversion circuit located to receive the reset signal and the data signal and configured to convert the reset signal into a digital typed reset signal and convert the data signal into a digital typed data signal;
a trigger circuit configured to output the readout reset signal to the first readout line, the readout reset signal activated when the reset signal is transited to the digital typed reset signal, and output the readout data signal to the first readout line, the readout data signal activated when the data signal is transited to the digital typed data signal;
a second readout line coupled to the second storing circuit; and
a line control circuit located to receive a control signal having different logic values during the readout reset period and the readout data period and configured to selectively receive the readout reset signal from the trigger circuit based on the control signal and to transfer the readout reset signal to the second storing circuit.

13. The image sensing device of claim 12, wherein the line control circuit generates a readout control signal that corresponds to the readout reset signal during the readout reset period, and couples the second readout line to a ground voltage terminal during the readout data period.

14. The image sensing device of claim 12, wherein the line control circuit either couples the first readout line to the second readout line or separates the first readout line from the second readout line based on the control signal.

15. The image sensing device of claim 14, wherein the line control circuit couples the first readout line to the second readout line in response to the readout reset signal, and separates the first readout line from the second readout line in response to the readout data signal.

16. The image sensing device of claim 11, wherein the first storing circuit is configured to replace the count values that correspond to the readout reset signals with the count values that correspond to the readout data signals.

17. The image sensing device of claim 11, wherein the reset signal is generated before the data signal is generated.

18. The image sensing device of claim 11,
wherein the first storing circuit stores the count values that correspond to the readout reset signal during the readout reset period, and subsequently stores the count values that correspond the readout data signal during the readout data period,
wherein the second storing circuit stores the count values that correspond to the readout reset signal during the readout reset period and maintains, during the readout data period, the count values that have been stored during the readout reset period.

19. The image sensing device of claim 11, wherein the second storing circuit stores the count values that correspond to the readout reset signals when the first storing circuit replaces the count values that correspond to the readout reset signals with the count values that correspond to the readout data signals.

20. An image sensing device, comprising:
a pixel array including one or more pixel groups, each pixel group generating a reset signal and a data signal;
a plurality of lines coupled to the pixel array and structured to transfer reset signals and data signals that are received from pixel groups in the pixel array;
a readout circuit coupled to the plurality of lines and structured to output (1) a readout reset signal based on a reset signal from a pixel group during a first period of a control signal and (2) a readout data signal based on a data signal from the pixel group during a second period of the control signal, the control signal having different logic values during the first period and the second period and the second period proceeding after the first period;
first readout lines directly coupled to the readout circuit and structured to transfer readout reset signals and readout data signals that are associated with the pixel groups in the pixel array and are received from the readout circuit;
a global counter coupled to count the readout reset signals and the readout data signals and structured to generate global count signals represented count values in response to the readout reset signals and the readout data signals, respectively;
a first storing circuit directly coupled to the first readout lines to receive the readout reset signals and the readout data signals and further coupled to the global counter to receive the count values and store the count values that correspond to the readout reset signals during the first period and store the count values that correspond to the readout data signals during the second period;
a line control circuit coupled to the first storing circuit and structured to selectively receive the readout reset signals from the readout circuit based on the control signal and to generate readout control signals that respectively correspond to the readout reset signals;
second readout lines directly coupled to the line control circuit and structured to transfer the readout control signals received from the line control circuit; and
a second storing circuit directly coupled to the second readout lines to receive the readout control signals from the line control circuit and further coupled to the global counter to receive the count values and store the count values that correspond to the readout reset signals during the first period and maintain, during the second period, the count values that have been stored during the first period.

21. The image sensing device of claim 20, wherein a first distance between the first storing circuit and the pixel array is shorter than a second distance between the second storing circuit and the pixel array.

* * * * *